(12) United States Patent
Iijima et al.

(10) Patent No.: US 8,016,919 B2
(45) Date of Patent: Sep. 13, 2011

(54) $CO_2$ RECOVERY SYSTEM AND SOLID-PARTICLES REMOVING METHOD FOR USE IN THE SAME

(75) Inventors: Masaki Iijima, Hiroshima (JP); Takashi Kamijo, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 334 days.

(21) Appl. No.: 12/022,468

(22) Filed: Jan. 30, 2008

(65) Prior Publication Data
US 2008/0203036 A1 Aug. 28, 2008

(30) Foreign Application Priority Data
Feb. 27, 2007 (JP) .................. 2007-047421

(51) Int. Cl.
*B01D 53/14* (2006.01)
(52) U.S. Cl. ................ 95/178; 95/179; 95/183; 95/195; 95/196; 95/197; 95/205; 95/209; 95/236; 96/234; 96/236; 96/240; 96/242
(58) Field of Classification Search .......... 95/92
See application file for complete search history.

(56) References Cited

U.S. PATENT DOCUMENTS
| | | |
|---|---|---|
| 4,292,286 A | 9/1981 | Say et al. |
| 4,341,746 A | 7/1982 | Sarsten et al. |
| 5,190,662 A | 3/1993 | Keller et al. |

FOREIGN PATENT DOCUMENTS
| | | |
|---|---|---|
| EP | 001543 B1 | 4/2001 |
| JP | 3-151015 A | 6/1991 |
| JP | 5-245339 A | 9/1993 |
| JP | 6-99026 A | 4/1994 |
| JP | 2001-025627 A | 1/2001 |
| JP | 2001-104940 A | 4/2001 |
| SU | 1311765 A1 | 5/1987 |
| WO | 98/55392 A1 | 12/1998 |

OTHER PUBLICATIONS
Russian Office Action dated Apr. 14, 2009 (mailing date), issued in corresponding Russian Patent Application No. 2008103653.
European Search Report dated Jun. 25, 2008 issued in corresponding European Patent Application No. 08150341.9.
Japanese Office Action dated Mar. 22, 2011, issued in corresponding Japanese Patent Application No. 2007-047421.
Decision of Patent Grant dated Jul. 5, 2011, issued in corresponding Japanese Patent Application No. 2007-047421.

*Primary Examiner* — Duane Smith
*Assistant Examiner* — Tiffany N Palmer
(74) *Attorney, Agent, or Firm* — Westerman, Hattori, Daniels & Adrian, LLP (57) ABSTRACT

A solution contained in a regeneration tower is supplied to a filtering unit. The filter unit filters out solid particles contained in the solution. A washing unit washes out with backwash water solid particles filtered out by the filter unit. An evaporating unit receives the backwash water containing the solid particles, and heats received backwash water thereby obtaining solid-particles concentrated backwash water.

5 Claims, 6 Drawing Sheets

CO₂ RECOVERY SYSTEM AND SOLID-PARTICLES REMOVING METHOD FOR USE IN THE SAME

BACKGROUND OF THE INVENTION

1. Field of the Invention

The present invention relates to a $CO_2$ recovery system and a solid-particle removing method for use in the $CO_2$ recovery system that can filter out solid particles contained in $CO_2$-absorbing solution that is used for removing $CO_2$ from exhaust gas and then remove the filtered-out solid particles.

2. Description of the Related Art

In recent years the greenhouse effect has been pointed out as one of causes of the global warming, and a countermeasure against it is urgently required internationally to protect global environment. $CO_2$ emitted into the atmosphere has been considered the prime cause of the greenhouse effect. $CO_2$ sources range various fields of human activities, including burning of fossil fuels, and demands to suppress their $CO_2$ emission from these sources are on constant increase. Scientists have energetically studied means and methods for suppressing emission of $CO_2$ from power generation facilities such as power generation stations which use an enormous amount of fossil fuels. One of the methods includes bringing combustion exhaust gas of boilers into contact with an amine-based $CO_2$-absorbing solution. This method allows removal and recovery of $CO_2$ from the combustion exhaust gas. Another method includes storing recovered $CO_2$, i.e., not returning the recovered $CO_2$ to the atmosphere.

Various methods are known to remove and recover $CO_2$ from combustion exhaust gas using the $CO_2$-absorbing solution. Japanese Patent Application Laid-Open No. H5-245339 discloses a method of contacting the combustion exhaust gas with the $CO_2$-absorbing solution in an absorption tower, heating an absorbing solution having absorbed $CO_2$ in a regeneration tower, and releasing $CO_2$, regenerating the absorbing solution, and circulating the regenerated absorbing solution to the absorption tower again to be reused.

Figure 7:
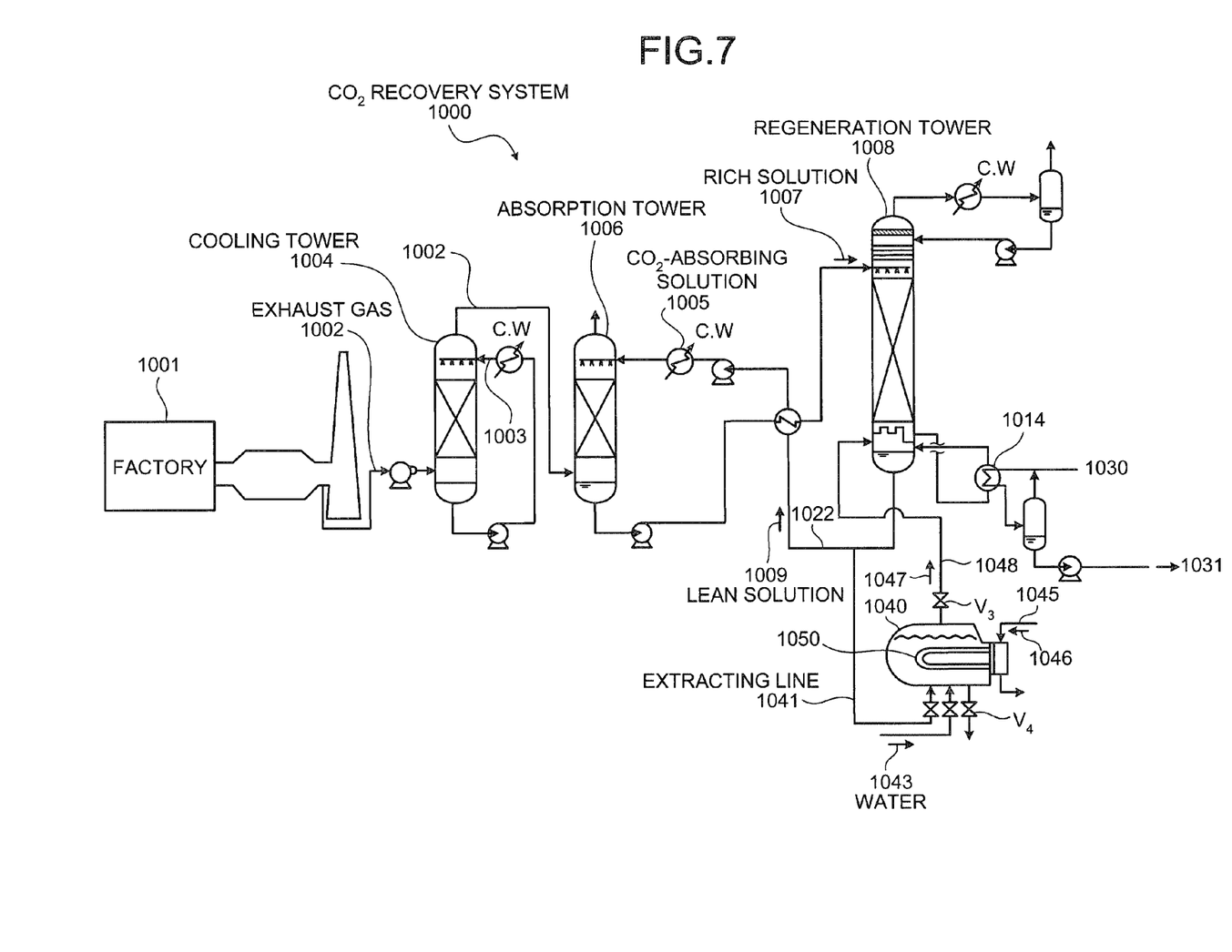
FIG. 7 is a schematic diagram of a conventional $CO_2$ recovery system.

As shown in FIG. 7, in a conventional $CO_2$ recovery system 1000, $CO_2$-containing exhaust gas 1002 discharged from a factory 1001 is cooled with coolant water 1003 in a cooling tower 1004. The factory 1001 can be a boiler. The cooled $CO_2$-containing exhaust gas 1002 is then conveyed to an absorption tower 1006 where it is brought into countercurrent contact with $CO_2$-absorbing solution 1005. The $CO_2$-absorbing solution 1005 can be an alkanolamine-based solution. $CO_2$ in the $CO_2$-containing exhaust gas 1002 is absorbed into the $CO_2$-absorbing solution 1005, that is, $CO_2$ is removed from the $CO_2$-containing exhaust gas 1002. The $CO_2$-absorbing solution 1005 containing $CO_2$ (hereinafter, "rich solution 1007") is conveyed to a regeneration tower 1008. The rich solution 1007 drips downward in the regeneration tower 1008. When the rich solution 1007 reaches a lower portion of the regeneration tower 1008, most of the $CO_2$ absorbed in the rich solution 1007 is released, and the rich solution 1007 turns into lean solution 1009 capable of working as the $CO_2$-absorbing solution 1005. The lean solution 1009 is heated with saturated steam 1030 in a regeneration heater 1014. Thereafter, the lean solution 1009 is returned to the absorption tower 1006 and it is reused as the $CO_2$-absorbing solution 1005. The saturated steam 1030 after use is discharged from the regeneration heater 1014 as steam concentrated water 1031.

In the $CO_2$ recovery system 1000, material such as a sulfur oxide (SOx) remain un-removed in a desulphurization step. Such residual material reacts with alkanolamine contained in the $CO_2$-absorbing solution 1005 in the $CO_2$-removing process thereby producing a thermostable salt. The thermostable salt mixes with the lean solution 1009, which creates various issues. The thermostable salt cannot be removed under normal conditions in a course of producing the lean solution 1009 from the rich solution 1007, so that the thermostable salt accumulates in the system while the lean solution 1009 circulates.

The $CO_2$ recovery system 1000 includes a reclaimer 1040 to which the lean solution 1009 that is produced in the regeneration tower 1008 is supplied. The reclaimer 1040 heats the lean solution 1009 to produce a condensed depleted material such as a salt. The condensed depleted material is then removed.

More particularly, the lean solution 1009 passing through a lean-solution supply line 1022 is extracted through an extracting line 1041 that is stretched from the lean-solution supply line 1022 to the reclaimer 1040. The reclaimer 1040 receives saturated steam 1046 from a saturated-steam supply line 1045 into a saturated-steam supply pipe 1050 and heats the lean solution 1009 with the saturated steam 1046. The depleted material is removed from the extracted lean solution 1009 in the reclaimer 1040. The lean solution 1009 is heated in the reclaimer 1040 to, for example, 130° C. to 150° C., so that vaporized $CO_2$-absorbing solution 1047 is obtained from the lean solution 1009. The vaporized $CO_2$-absorbing solution 1047 is supplied to the lower portion of the regeneration tower 1008. A condensed waste-product accumulated on a bottom of the reclaimer 1040 is removed from the system, for example, the boiler, for example, by pumping with a pump.

In the conventional $CO_2$ recovery system 1000, solid particles such as soot dust or fly ashes (coal ashes) remain un-removed by a desulfurization device (not shown) are removed in the absorption tower 1006. However, a part of the solid particles still remain un-removed in the lean solution 1009. The solid particles in the lean solution 1009 are filtered out by a filtering member, and the filtered-out solid particles are then removed. The filtering member after use is replaced with a new one and the old filtering member is discarded as a waste product. The filtering member can be, for example, a cartridge filter or a precoat filter.

If an amount of the solid particles in the lean solution 1009 is large, the filtering member needs to be replaced frequently, which brings heavy workload and produces a large amount of the waste product.

Assuming that the amount of the exhaust gas from the $CO_2$ recovery system 1000 is, for example, about 1,000,000 Nm3/h and the amount of dust out of the exhaust gas is, for example, about 5.0 mg/Nm3, about 40% of the dusts is removed in the cooling tower 1004 and the desulfurization device (not shown) and about 60% (i.e., the remaining dust) is removed in the absorption tower 1006. In other words, the amount of dusts removed in the absorption tower 1006 is as much as 1,000,000 (Nm3/h)×5.0 (mg/Nm3)×0.6%=3.0 kg/h.

A maximum collectable dust-amount of a typical filter is about from 100 grams to 200 grams per bottle. It means that 15 to 30 filters are replaced every hour. Such frequent filter replacement is impossible in practical, and the conventional filtering cannot use in the large-capacity $CO_2$ recovery system.

The lean solution 1009 contains the $CO_2$-absorbing solution 1005 that contains amine. Therefore, a chemical oxygen demand (COD) of the lean solution 1009 is high, and the lean solution 1009 cannot be drained out as effluent.

There is a need for producing a large-capacity $CO_2$ recovery system, such as the amount of exhaust gas is, for example, 1,000,000 Nm3/h and the amount of dust removed in the absorption tower is as much as, for example, 3.0 kg/h, that can remove without breaks a large amount of the solid particles from the lean solution 1009.

The present invention has been achieved to solve the above problems in the conventional technology and it is an object of the present invention to provide a $CO_2$ recovery system capable of recovering a large amount of $CO_2$ thereby producing dust to be removed in the absorption tower as much as, for example, 3.0 kg/h and a solid-particles removing method for use in the $CO_2$ recovery system that can remove the solid particles from the lean solution.

SUMMARY OF THE INVENTION

It is an object of the present invention to at least partially solve the problems in the conventional technology.

According to an aspect of the present invention, there is provided a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution. The $CO_2$ recovery system includes a filtering unit that includes an outer casing and at least one filter member, wherein when a solution contained in the regeneration tower is supplied to the outer casing the filter member filters out solid particles contained in the solution; a washing unit that washes out with backwash water the solid particles filtered out by the filter member; and an evaporating unit that receives the backwash water containing the solid particles, and heats received backwash water thereby obtaining solid-particles concentrated backwash water.

According to another aspect of the present invention, there is provided a solid-particles removing method for use in a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution. The solid-particles removing method includes filtering a solution contained in the regeneration tower contained thereby filtering out solid particles contained in the solution by a filtering member; washing out with backwash water the solid particles that is filtered out by the filtering member; heating by an evaporating unit the backwash water containing the solid particles thereby obtaining concentrated solid particles; and removing the concentrated solid particles.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
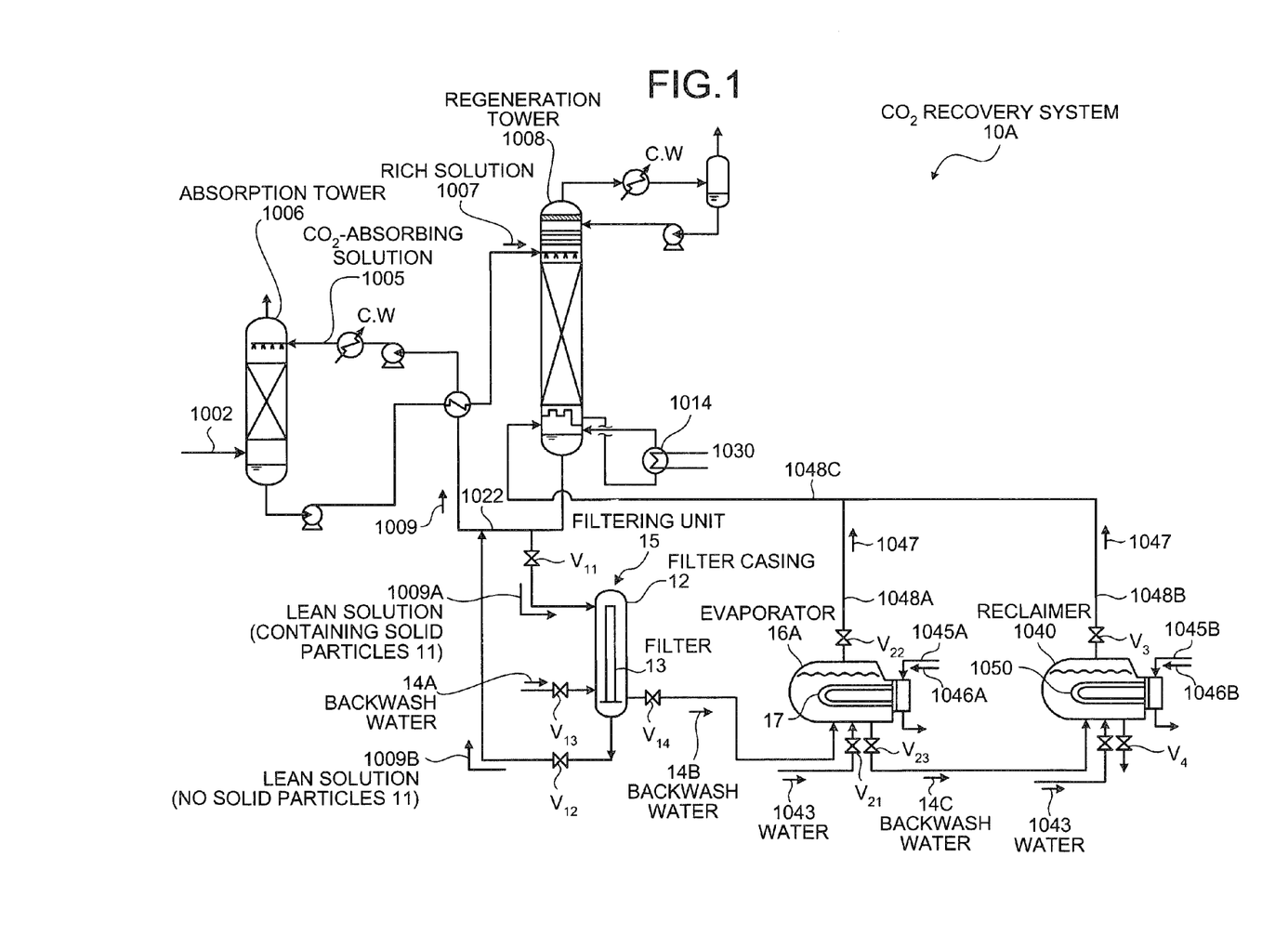
FIG. 1 is a schematic diagram of a $CO_2$ recovery system according to a first embodiment of the present invention.
Figure 2:
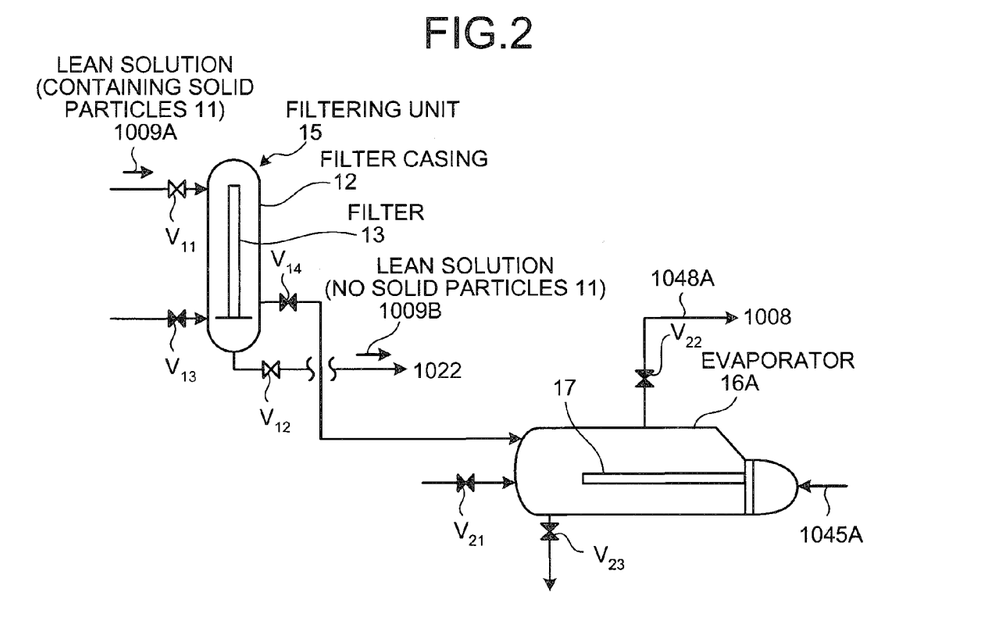
FIG. 2 is a schematic diagram of a filtering unit shown in FIG. 1 during filtering a lean solution.
Figure 3:
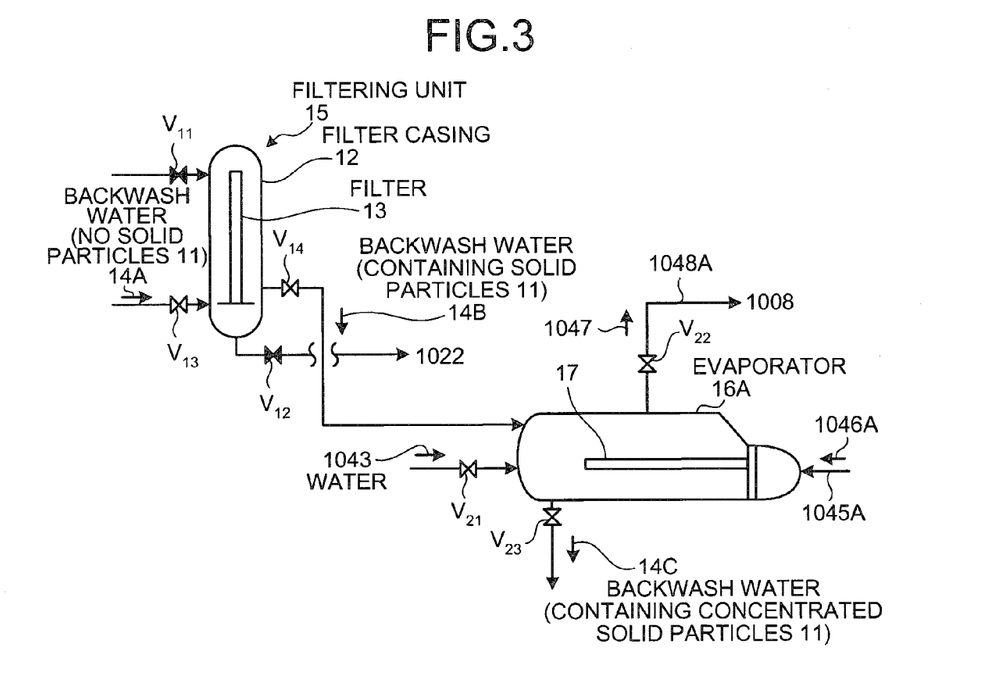
FIG. 3 is a schematic diagram of the filtering unit during receiving backwash water into a filter.

FIG. 1 is a schematic diagram of a $CO_2$ recovery system 10A according to a first embodiment of the present invention; FIG. 2 is a schematic diagram of a filtering unit 15 shown in FIG. 1 during filtering a lean solution 1009A; and FIG. 3 is a schematic diagram of the filtering unit 15 during receiving backwash water 14A into the filtering unit 15. Parts corresponding to those in the $CO_2$ recovery system 1000 are denoted with the same reference numerals, and the same description is not repeated. The factory 1001 and the cooling tower 1004 are not shown.

The $CO_2$ recovery system 10A includes the absorption tower 1006 and the regeneration tower 1008. In the absorption tower 1006, the $CO_2$-containing exhaust gas 1002 comes in contact with the $CO_2$-absorbing solution 1005 for absorbing $CO_2$ therein to remove the $CO_2$ from the $CO_2$-containing exhaust gas 1002. In the regeneration tower 1008, the rich solution 1007 containing $CO_2$ is regenerated and thermal exchange is performed. The lean solution 1009 that is produced after removing $CO_2$ from the rich solution 1007 in the regeneration tower 1008 (regenerated $CO_2$-absorbing solution) returns to the absorption tower 1006 as the $CO_2$-absorbing solution 1005. The $CO_2$ recovery system 10A additionally includes the filtering unit 15 and an evaporator 16A. The filtering unit 15 includes a filter 13 and a filter casing 12. The filter 13 filters out solid particles 11, such as soot dust or fly ashes, contained in the lean solution 1009A. The lean solution 1009A is a part of the lean solution 1009 passing through the lean-solution supply line 1022. The solid particles 11 filtered out by the filter 13 are washed out with the backwash water 14A that is supplied to the filter casing 12. The evaporator 16A is located downstream of the filtering unit 15. The evaporator 16A heats the backwash water 14A containing the solid particles 11 (hereinafter, "backwash water 14B") to concentrate the solid particles 11 in the backwash water 14B.

In the $CO_2$ recovery system 10A, the filtering unit 15 filters out the solid particles 11 remain un-removed in the lean solution 1009A with the filter 13 that is accommodated in the filter casing 12.

By means of the filter 13 that filters out the solid particles 11 contained in the lean solution 1009A, it is possible to supply the lean solution not containing the solid particles 11 (hereinafter, "lean solution 1009B") to the lean-solution supply line 1022.

An outlined valve-mark shown in FIGS. 2 and 3 represents an open valve, and a filled valve-mark represents a closed valve. During the filtering unit 15 filtering the lean solution 1009A as shown in FIG. 2, valves $V_{11}$ and $V_{12}$ are open and valves $V_{13}$ and $V_{14}$ are closed. The filtering unit 15 receives the lean solution 1009A in the filter casing 12, and causes the filter 13 to filter out the solid particles 11 contained in the lean solution 1009A thereby producing the lean solution 1009B. The leans solution 1009B is then supplied to the lean-solution supply line 1022.

The filtering unit 15 has a backwash function to wash out the solid particles 11 filtered out by the filter 13 with the backwash water 14A that is received in the filter casing 12.

The backwash water 14A flows in the filter casing 12, for example, from an outer surface to an inner surface of the filter 13, that is, a direction reverse to a flow of the lean solution 1009A in the filter casing 12, so that the solid particles 11 attached on the inner surface or inside of the filter 13 are removed from the filter 13. As a result, the solid particles 11 attached on the filter 13 are contained in the backwash water 14A, that is, the solid particles 11 are washes away from the filter 13.

During backwashing the filter 13 with the backwash water 14A received in the filter casing 12 as shown in FIG. 3, the valves $V_{11}$ and $V_{12}$ are closed and the valves $V_{13}$ and $V_{14}$ are open. The backwash water 14A is supplied to the filtering unit 15, and then the solid particles 11 are contained in the backwash water 14A, that is, the solid particles 11 are washes away from the filter 13. The backwash water 14A containing the solid particles 11 (i.e., the backwash water 14B) is discharged from the filtering unit 15.

In the $CO_2$ recovery system 10A, there provided the evaporator 16A that is located downstream of the filtering unit 15 for heating the backwash water 14B to concentrate the solid particles 11 in the backwash water 14B.

Upon receiving the backwash water 14B, the evaporator 16A receives saturated steam 1046A passing through a saturated-steam supply line 1045A in a vaporization pipe 17 and heats the backwash water 14B with the saturated steam 1046A thereby obtaining a backwash water 14C that contains the concentrated solid particles 11.

The backwash water 14B can contains the $CO_2$-absorbing solution 1005. The evaporator 16A vaporizes the $CO_2$-absorbing solution 1005 contained in the backwash water 14B thereby obtaining the vaporized $CO_2$-absorbing solution 1047. It means that, the evaporator 16A can heat the backwash water 14B to concentrate the solid particles 11 in the backwash water 14B while separating the $CO_2$-absorbing solution 1005 from the backwash water 14B.

The evaporator 16A also receives water 1043. The concentration of the $CO_2$-absorbing solution 1005 in the backwash water 14B is high. The evaporator 16A receives the water 1043 thereby vaporizing the $CO_2$-absorbing solution 1005 from the backwash water 14B having a low $CO_2$-absorbing solution 1005 concentration.

As a result, the backwash water 14B turns to the backwash water 14C that contains the concentrated solid particles 11 in the evaporator 16A. The backwash water 14C is then discharged from the evaporator 16A.

A typical reclaimer uses, for example, two kilograms to five kilograms of steam per hour to concentrate suspensoid ingredients contained in the lean solution. In contrast, the evaporator 16A uses, for example, two kilograms to three kilograms of steam as the saturated steam 1046A and the water 1043.

Thus, the evaporator 16A vaporizes the $CO_2$-absorbing solution 1005 at a temperature lower than that in the reclaimer 1040 while concentrating the suspensoid ingredients contained in the backwash water 14B. This is why the evaporator 16A is provided separated from the reclaimer 1040. As described later, the $CO_2$-absorbing solution 1005 remain un-removed in the backwash water 14C is vaporized in the reclaimer 1040 that is located downstream of the evaporator 16A. The concentrated solid particles 11 contained in the backwash water 14C are then removed.

During the evaporator 16A receiving the backwash water 14B and heating the received backwash water 14B to concentrate the solid particles 11 in the backwash water 14B as shown in FIG. 3, when valves $V_{21}$ is open, the evaporator 16A receives the water 1043 via the valve $V_{21}$ and heats the backwash water 14B with the saturated steam 1046 passing through the saturated-steam supply line 1045A. When valve $V_{22}$ is open, the vaporized $CO_2$-absorbing solution 1047 that is obtained from the backwash water 14B flows via the valve $V_{22}$ to the regeneration tower 1008 passing through vaporized $CO_2$-absorbing solution supply lines 1048A and 1048C and accumulates on a bottom of the regeneration tower 1008. When valve $V_{23}$ is open, the backwash water 14C is discharged from the evaporator 16A.

The $CO_2$ recovery system 10A includes the reclaimer 1040 that is located downstream of the evaporator 16A. Upon receiving the backwash water 14C from the evaporator 16A, the reclaimer 1040 receives saturated steam 1046B passing through a saturated-steam supply line 1045B and heats the backwash water 14C with the saturated steam 1046B thereby vaporizing the $CO_2$-absorbing solution 1005 remain un-removed in the backwash water 14C and concentrating the solid particles 11 in the backwash water 14C. The concentrated solid particles are then removed. When a valve $V_3$ is open, the $CO_2$-absorbing solution 1005 in the vapor state (the vaporized $CO_2$-absorbing solution 1047) flows via the valve $V_3$ to the regeneration tower 1008 passing through the vaporized $CO_2$-absorbing solution supply lines 1048B and 1048C and accumulates on the bottom of the regeneration tower 1008. When a valve $V_4$ is open, the solid particles 11 concentrated from the backwash water 14C are removed from the reclaimer 1040.

Figure 4:
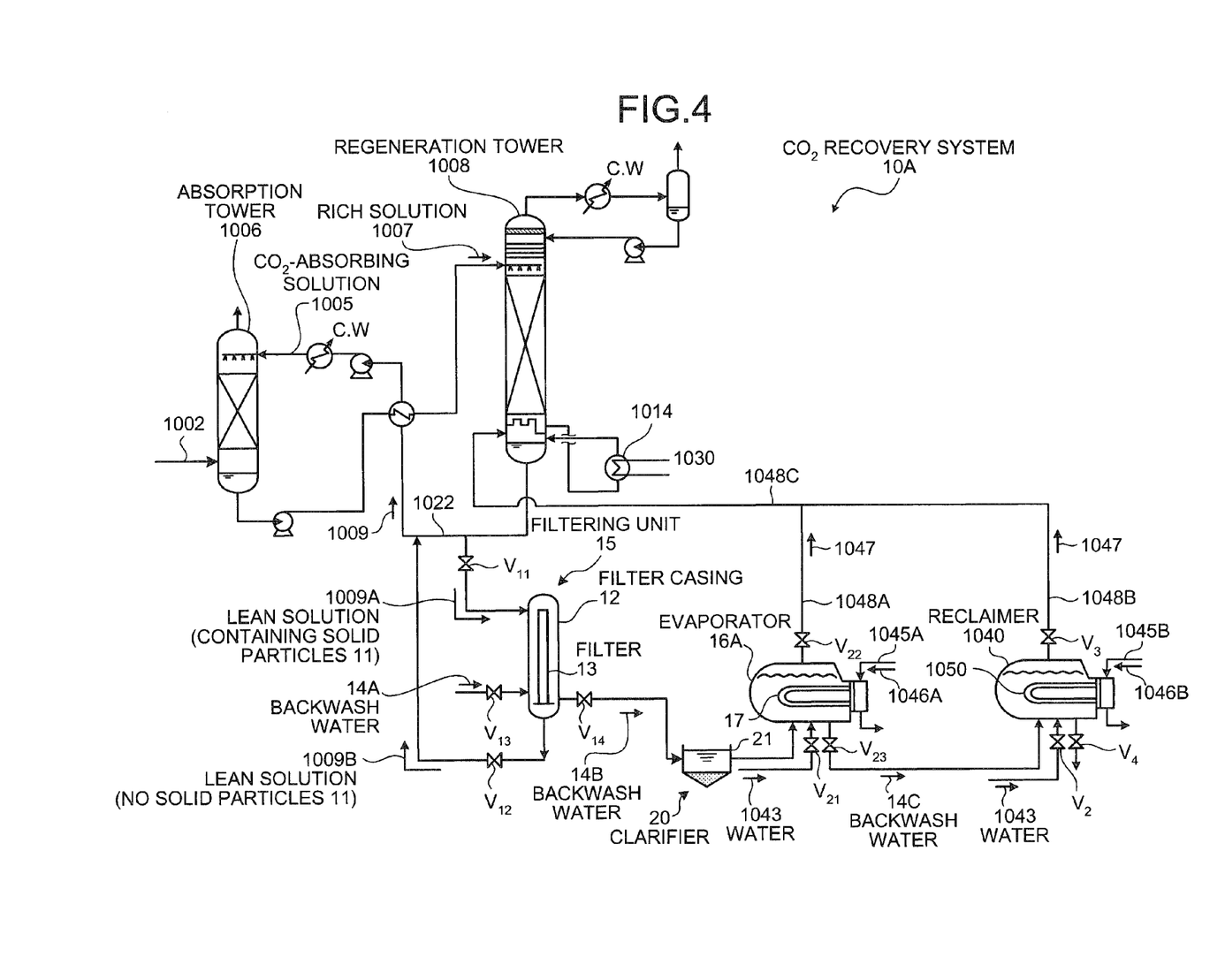
FIG. 4 is a schematic diagram of a modification of the $CO_2$ recovery system according to the first embodiment.

The $CO_2$ recovery system 10A can include, as shown in FIG. 4, a clarifier 20 arranged between the filtering unit 15 and the evaporator 16A to precipitate a part of the solid particles 11 contained in the backwash water 14B. The precipitated part is then removed. More particularly, the backwash water 14B is supplied to a clarifier casing 21 of the clarifier 20. A part of the solid particles 11 contained in the backwash water 14B is precipitated in the clarifier casing 21, and the precipitated part is then removed. The evaporator 16A receives the backwash water 14B containing a less amount of the solid particles 11. This allows reducing the load on the evaporator 16A.

As described above, in the process for use in the $CO_2$ recovery system 10A of treating the $CO_2$-containing exhaust gas 1002 with the $CO_2$-absorbing solution 1005 containing amine or the like, the filtering unit 15 filters out with the filter 13 the solid particles 11 contained in the lean solution 1009, and the solid particles 11 attached onto the surface of the filter 13 is washed out with the backwash water 14A. This enables the filtering unit 15 to filter out a large amount of the solid particles 11 without replacement. Thereafter, the evaporator 16A vaporizes the $CO_2$-absorbing solution 1005 contained in the backwash water 14B and concentrates the solid particles 11. The concentrated solid particles 11 are then removed. With such configuration, even if the $CO_2$ recovery system is such large that can produce soot dust to be removed as much as, for example, 3.0 kg/h in the absorption tower 1006, the large amount of the solid particles contained in the lean solution can be removed continuously in a shorter period.

According to the first embodiment, a hollow fiber membrane, a sintered metallic filter, or a microfiltration membrane is used as the filter 13. Another filter can be used as the filter 13.

Moreover, the backwash water 14A is used for washing out the solid particles 11 from the filter 13. It is allowable to use, for example, compressed air for removing the solid particles 11 from the filter 13 instead of the backwash water 14A.

Furthermore, solution from which the solid particles 11 are removed is the lean solution 1009A that is partially extracted from the lean solution 1009 passing through the lean-solution supply line 1022. It is allowable to use a part of the rich solution 1007 instead of the lean solution 1009.

Moreover, it is allowable to use both the lean solution 1009A and a part of the rich solution 1007 instead of the lean solution 1009A.

Figure 5:
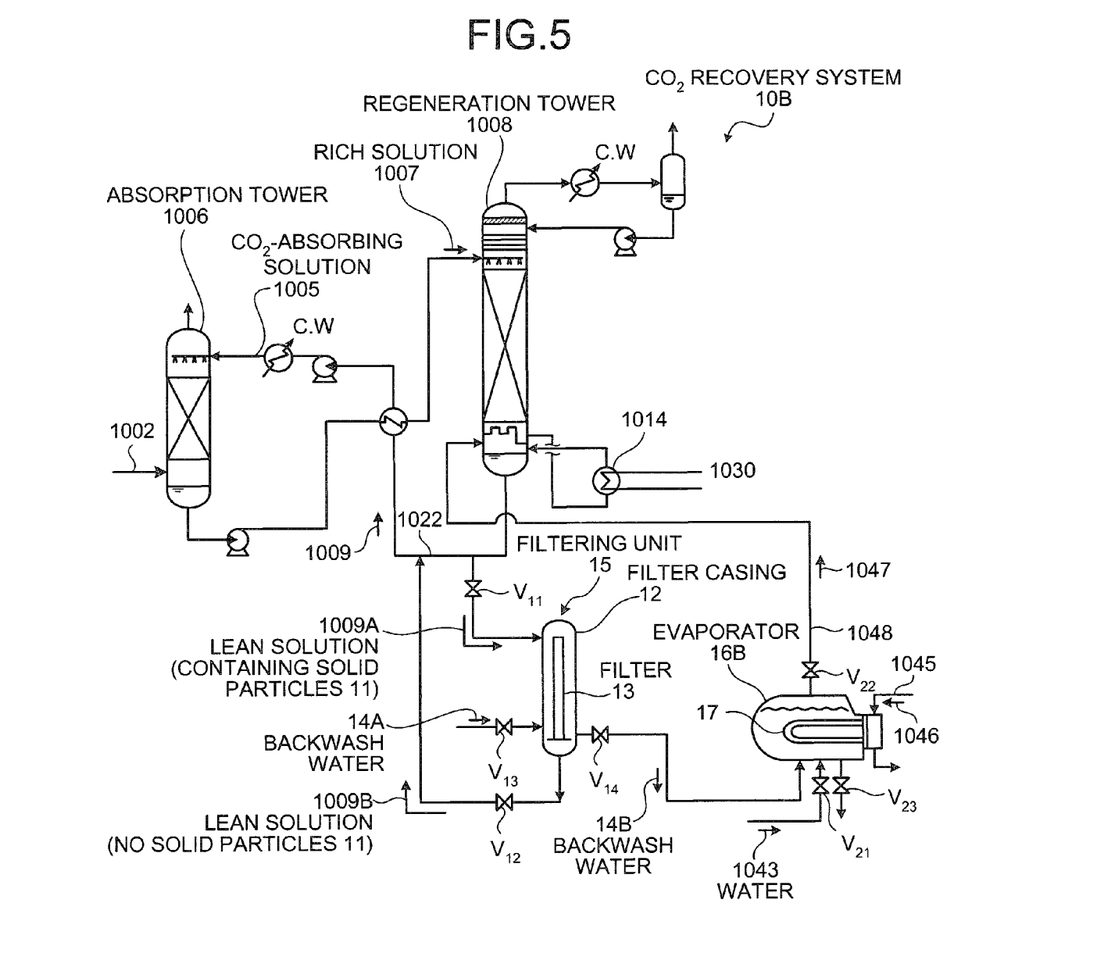
FIG. 5 is a schematic diagram of a $CO_2$ recovery system according to a second embodiment of the present invention.

FIG. 5 is a schematic diagram of a $CO_2$ recovery system 10B according to a second embodiment of the present invention. Parts corresponding to those in the $CO_2$ recovery system 10A according to the first embodiment and the conventional $CO_2$ recovery system 1000 are denoted with the same reference numerals, and the same description is not repeated. The factory 1001 and the cooling tower 1004 are not shown.

An evaporator 16B in the $CO_2$ recovery system 10B functions as both the evaporator 16A and the reclaimer 1040. More particularly, the evaporator 16B heats the backwash water 14B thereby vaporizing the $CO_2$-absorbing solution 1005 contained in the backwash water 14B and concentrates the solid particles 11 in the backwash water 14B. The concentrated solid particles 11 are then removed.

In the $CO_2$ recovery system 10B, the evaporator 16B heats the backwash water 14B thereby vaporizing the $CO_2$-absorbing solution 1005 from the backwash water 14B and concentrating the solid particles 11 in the backwash water 14B.

In the $CO_2$ recovery system 10B, both vaporization of the $CO_2$-absorbing solution 1005 remain in the backwash water 14B and concentration of the solid particles 11 in the backwash water 14B are performed only in the evaporator 16B.

The evaporator 16B has functions of vaporizing the $CO_2$-absorbing solution 1005 from the backwash water 14B and concentrating the solid particles 11 in the backwash water 14B with heat, which allows reducing a size of the $CO_2$ recovery system 10B as compared to the $CO_2$ recovery system 10A that includes the evaporator 16A and the reclaimer 1040 separately.

Figure 6:
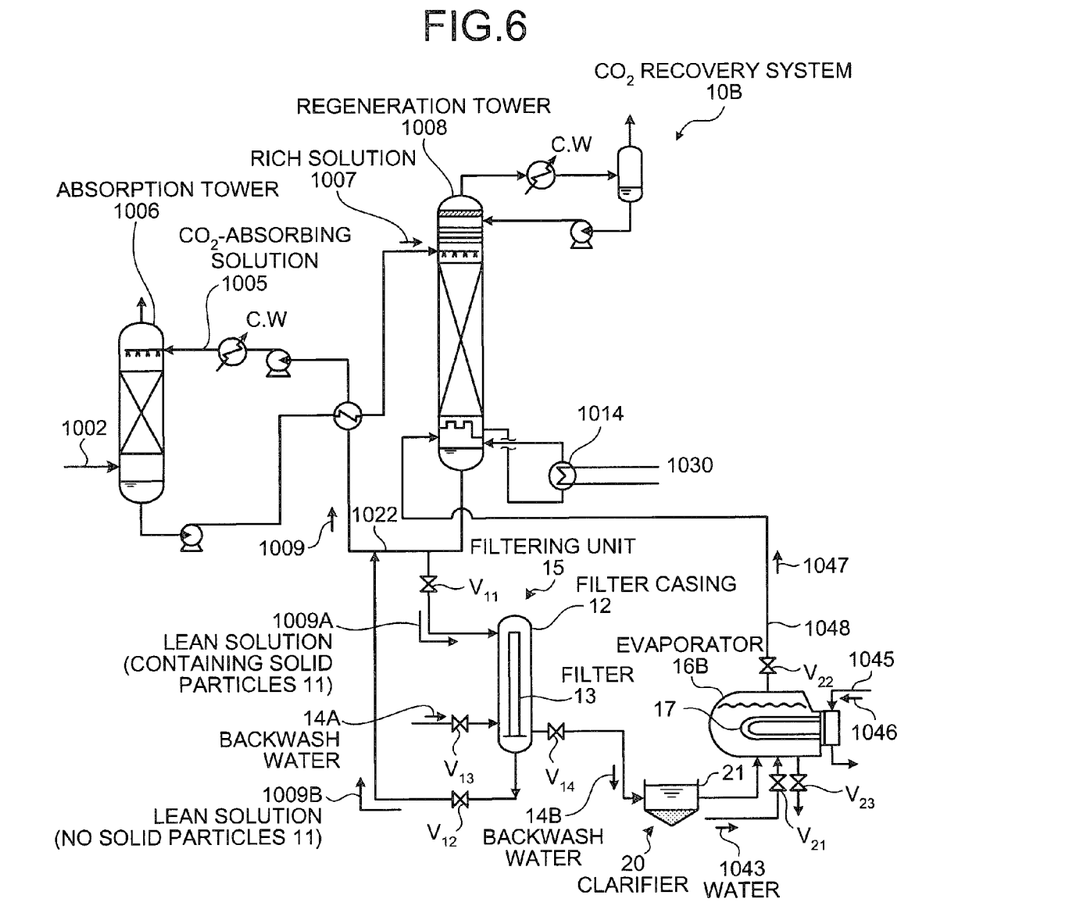
FIG. 6 is a schematic diagram of a modification of the $CO_2$ recovery system according to the second embodiment.

The $CO_2$ recovery system 10B can includes, as shown in FIG. 6, the clarifier 20 arranged between the filtering unit 15 and the evaporator 16B to remove a precipitated portion of the solid particles 11 from the backwash water 14B. The backwash water 14B, which contains the solid particles 11, is supplied to the clarifier casing 21. A part precipitated in the clarifier casing 21 out of the solid particles 11 contained in the backwash water 14B is then removed. The evaporator 16B receives the backwash water 14B containing a less amount of the solid particles 11. This allows reducing the load on the evaporator 16B.

According to an embodiment of the present invention, in the process of treating the exhaust gas with the $CO_2$-absorbing solution that contains amine or the like, a filtering unit filters out with a backwashable filter solid particles contained in at least one of the lean solution and the rich solution, and the solid particles filtered out by the filter is washed out with backwash water. Thereafter, an evaporator vaporizes the $CO_2$-absorbing solution contained in the backwash water and concentrates the solid particles contained in the backwash water. The concentrated solid particles are then removed. Even if the $CO_2$ recovery system is such large that can produce soot dust to be removed as much as, for example, 3.0 kg/h in the absorption tower, the large amount of the solid particles contained in the lean solution can be removed continuously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A $CO_2$ recovery system including an absorption tower that receives $CO_2$-containing gas and $CO_2$-absorbing solution, and that causes the $CO_2$-containing gas to come into contact with the $CO_2$-absorbing solution to produce $CO_2$ rich solution, and a regeneration tower that receives the rich solution and produces lean solution from the rich solution by removing $CO_2$ from the rich solution, the $CO_2$ recovery system comprising:

a single filtering unit located downstream of the regeneration tower, that includes an outer casing and at least one filter member, wherein when the lean solution originating from the regeneration tower is supplied to the outer casing, the filter member filters out solid particles contained in the solution through a first line so that the lean solution not containing the solid particles is supplied through a lean-solution supply line to the regeneration tower;

a single washing unit located downstream of the regeneration tower, connected to the filtering unit through a second line, that washes out with backwash water the solid particles filtered out by the filter member so that the backwash water containing the solid particles is supplied to an evaporating unit located downstream of the washing unit;

the evaporating unit that receives the backwash water containing the solid particles from the washing unit heats the received backwash water thereby vaporizing $CO_2$-absorbing solution remaining in the received backwash water and obtaining concentrated solid particles and then discharges the solid-particle concentrated backwash water to a reclaimer located downstream of the evaporating unit while supplying the vaporized $CO_2$-absorbing solution passing through one of vaporized $CO_2$-absorbing solution supply lines to the regeneration tower; and the reclaimer that receives the solid-particles concentrated backwash water from the evaporating unit heats the received backwash water thereby vaporizing the $CO_2$-absorbing solution remaining in the received backwash water and obtaining concentrated solid particles so that the $CO_2$-absorbing solution is supplied through another of vaporized $CO_2$-absorbing solution supply lines to the regeneration tower while removing the concentrated solid particles, wherein the first line and the second line are respectively provided with valves so that the filtering unit receives alternately the said solution or the backwash water.

2. The $CO_2$ recovery system according to claim 1, further comprising a clarifier that receives the backwash water containing the solid particles, and precipitates a part of the solid particles contained in the received backwash water thereby obtaining less solid-particles containing backwash water, wherein the evaporating unit receives the less solid-particles containing backwash water.

3. A solid-particles removing method to be used in a $CO_2$ recovery system including an absorption tower that receives $CO_2$-containing gas and $CO_2$-absorbing solution, and that causes the $CO_2$-containing gas to come into contact with the $CO_2$-absorbing solution to produce $CO_2$ rich solution, and a regeneration tower that receives the rich solution and produces lean solution from the rich solution by removing $CO_2$ from the rich solution, the solid-particles removing method comprising:

filtering the lean solution originating from the regeneration tower thereby filtering out solid particles contained in the solution by a single filtering unit located downstream of the regeneration tower, that includes an outer casing and at least one filter member, when a first line connected to the filtering unit is opened;

washing out by a single washing unit located downstream of the regeneration tower, with backwash water the solid particles that are filtered out by the filter member when a second line, also connected to the filtering unit is opened;

receiving by the evaporating unit the backwash water containing the solid-particles from the washing unit and heating the received backwash water containing the solid-particles thereby obtaining solid-particles concentrated backwash water thereby vaporizing the $CO_2$-absorbing solution remaining in the backwash water containing the solid-particles and obtaining the concentrated solid particles while supplying the solid-particles concentrated backwash water to a reclaimer located downstream of the evaporation unit and also supplying the vaporized $CO_2$-absorbing solution passing through vaporized $CO_2$-absorbing solution supply lines via one lean-solution supply line to the regeneration tower; and receiving by the reclaimer the solid-particles concentrated backwash water from the evaporating unit and heating the received solid-particles concentrated backwash water thereby vaporizing the $CO_2$-absorbing solution remaining in the received solid-particles concentrated backwash water and obtaining concentrated solid particles while supplying the $CO_2$-absorbing solution passing through vaporized $CO_2$-absorbing solution supply lines via another lean-solution supply line to the regeneration tower, wherein the method further comprising the step of respectively providing the first line and the second line so that the filtering unit receives alternately the said solution or the backwash water.

4. The solid-particles removing method according to claim 3, further comprising precipitating by a clarifier a part of the solid particles contained in the backwash water containing the solid particles thereby obtaining less solid-particles containing backwash water, wherein the heating by the evaporating unit includes heating the less solid-particles containing backwash water thereby obtaining the concentrated solid particles.

5. The $CO_2$ recovery system according to claim 1, wherein the backwash water flows in the outer casing in reverse direction compared to the flow of the said solution.

* * * * *